US012623438B2

(12) United States Patent (10) Patent No.: US 12,623,438 B2
Noishiki et al. (45) Date of Patent: May 12, 2026

(54) VAPOR DEPOSITION PAPER AND METHOD FOR PRODUCING SAME

(71) Applicant: Oji Holdings Corporation, Tokyo (JP)

(72) Inventors: Yasutomo Noishiki, Tokyo (JP); Yuta Shamoto, Tokyo (JP); Misaki Wakabayashi, Tokyo (JP); Miyoko Tanaka, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 449 days.

(21) Appl. No.: 18/260,604

(22) PCT Filed: Jan. 13, 2022

(86) PCT No.: PCT/JP2022/000825
§ 371 (c)(1),
(2) Date: Jul. 6, 2023

(87) PCT Pub. No.: WO2022/154032
PCT Pub. Date: Jul. 21, 2022

(65) Prior Publication Data
US 2024/0383229 A1 Nov. 21, 2024

(30) Foreign Application Priority Data

Jan. 15, 2021 (JP) ................................. 2021-005202
Apr. 12, 2021 (JP) ................................. 2021-067015
Apr. 27, 2021 (JP) ................................. 2021-074836

(51) Int. Cl.
B32B 9/06 (2006.01)
B32B 27/32 (2006.01)
B32B 27/36 (2006.01)
B32B 27/40 (2006.01)

(52) U.S. Cl.
CPC ............... B32B 9/06 (2013.01); B32B 27/32 (2013.01); B32B 27/36 (2013.01); B32B 27/40 (2013.01); *B32B 2255/12* (2013.01); *B32B 2255/205* (2013.01); *B32B 2255/26* (2013.01); *B32B 2255/28* (2013.01); *B32B 2307/724* (2013.01); *B32B 2307/7376* (2023.05)

(58) Field of Classification Search
CPC .......... B32B 9/06; B32B 15/12; D21H 19/08; D21H 19/40
See application file for complete search history.

(56) References Cited

U.S. PATENT DOCUMENTS

| | | | | |
|---|---|---|---|---|
| 2021/0245481 A1* | 8/2021 | Nyflött | ..................... | B32B 27/10 |
| 2022/0033129 A1* | 2/2022 | Pang | ........................ | B65D 3/06 |
| 2023/0068867 A1* | 3/2023 | Yuki | ...................... | D21H 27/14 |
| 2023/0242314 A1* | 8/2023 | Ishii | ....................... | D21H 19/08 |
| | | | | 383/113 |

FOREIGN PATENT DOCUMENTS

| | | | |
|---|---|---|---|
| CN | 210 116 793 U | | 2/2020 |
| EP | 0 819 192 B1 | | 3/2001 |
| EP | 4166326 A1 | | 4/2023 |
| JP | H03-136842 | | 6/1991 |
| JP | H04-065599 | | 3/1992 |
| JP | H04213377 A | * | 8/1992 |
| JP | H05-195487 | | 8/1993 |
| JP | H07-223686 | | 8/1995 |
| JP | H07-256811 | | 10/1995 |
| JP | H09-070937 | | 3/1997 |
| JP | H10-202781 | | 8/1998 |
| JP | 2002-321307 | | 11/2002 |
| JP | 2008-087785 | | 4/2008 |
| JP | 2009-154906 | | 7/2009 |
| JP | 2017100359 A | * | 6/2017 |
| JP | 6944023 | | 10/2021 |
| WO | WO 2019/239334 | | 12/2019 |

OTHER PUBLICATIONS

JP 2017-100359 Machine translation (Year: 2017).*
JP H04-213377 Machine Translation (Year: 1992).*
JP H05-195487 Machine Translation (Year: 1993).*
International Search Report in PCT/JP2022/000825 mailed Mar. 15, 2022.
Extended European Search Report issued on Oct. 28, 2024 in corresponding European Patent Application No. 22739437.6 in 8 pages.

* cited by examiner

*Primary Examiner* — Zachary M Davis
(74) *Attorney, Agent, or Firm* — Knobbe, Martens, Olson & Bear, LLP

(57) ABSTRACT

A vapor deposition paper having barrier properties and excellent recyclability. The vapor deposition paper includes a clay coat layer; an undercoat layer; a vapor deposition layer; an overcoat layer; and a heat seal layer in this order on at least one surface of a paper substrate, in which the vapor deposition layer contains at least one of a metal and ceramic and has a thickness of 1 nm or more and 1000 nm or less, and the pulp recovery rate after re-disintegration of the vapor deposition paper is 80% or more.

18 Claims, No Drawings

VAPOR DEPOSITION PAPER AND METHOD FOR PRODUCING SAME

CROSS-REFERENCE TO RELATED APPLICATIONS

This application is the U.S. National Phase under 35 U.S.C. § 371 of International Application PCT/JP2022/000825, filed Jan. 13, 2022, which claims priority to Japanese Patent Application No. 2021-005202, filed Jan. 15, 2021; Japanese Patent Application No. 2021-067015, filed Apr. 12, 2021; and Japanese Patent Application No. 2021-074836, filed Apr. 27, 2021, the entire contents of which are incorporated herein by reference.

TECHNICAL FIELD

The present invention relates to a vapor deposition paper and a method for producing the same.

BACKGROUND ART

Conventionally, packaging materials obtained by imparting water vapor barrier properties of blocking water vapor or gas barrier properties of blocking gases other than water vapor to paper substrates, particularly packaging materials obtained by imparting oxygen barrier properties of blocking oxygen to paper substrates, have been used for preventing, in packaging food, medical products, electronic parts, and the like, deterioration of quality of the contents.

As methods for imparting the water vapor barrier properties and the gas barrier properties to paper substrates, a method which includes laminating a synthetic resin film having excellent water vapor barrier properties and gas barrier properties on the paper substrate is common. However, materials in which the synthetic resin film or the like is laminated on the paper substrate have posed environmental problems due to a difficulty in recycling the paper, the synthetic resin, and the like after use.

Thus, the development of barrier materials having the water vapor barrier properties and the gas barrier properties without using the synthetic resin films or the like has been advanced. For example, Patent Literature 1 discloses a paper packaging material having barrier properties against moisture and oxygen provided with an organic material coating layer, a metal or metal oxide layer, and an organic material coating layer inside a paper layer.

On the other hand, a metallized paper has been widely used for a label paper having excellent design properties for alcoholic beverages, beer, soft drinks, and the like, a packaging paper for confectionery, and the like utilizing its glossy feeling. However, the metallized paper requires the formation of a metal thin film on a paper substrate, and therefore an improvement of the adhesiveness and production methods thereof have been examined. For example, Patent Literature 2 discloses an aluminum metallized paper obtained by providing an aluminum vapor deposition layer on a base paper, the base paper having a rear surface treated such that the natural polarization potential value of the surface of the vapor deposition layer falls within a specific range.

Patent Literature 3 discloses a sealing sheet for PTP packaging having a filling coating layer by a polyolefin aqueous dispersion liquid, a vapor deposition thin film layer containing inorganic oxide, and a heat seal resin layer sequentially formed on one surface of a thin paper having a basis weight equal to or less than a specific value.

PRIOR ART

Patent Literature

Patent Literature 1: JP 2002-321307 A
Patent Literature 2: JP 1992-65599 A
Patent Literature 3: JP 1995-223686 A

SUMMARY OF INVENTION

Technical Problem

The vapor deposition paper described in each of Patent Literature 1 and 2 has a problem of difficulty in recovering pulp in re-disintegration, resulting in poor recyclability. Hereinafter, this problem is referred to as the first problem.

Further, it has been found that the sealing sheet for PTP packaging described in Patent Literature 3 has a problem of poor barrier properties (oxygen barrier properties). Hereinafter, this problem is referred to as the second problem.

Thus, it is an object of the present invention to provide a vapor deposition paper having barrier properties and excellent recyclability.

The first problem of the present invention can be solved by the following structures <A1> to <A22>.

<A1> A paper laminate comprising: a clay coat layer; an undercoat layer; a vapor deposition layer; an overcoat layer; and a heat seal layer in this order on at least one surface of a paper substrate, wherein the vapor deposition layer is at least one of a layer comprising metal and a layer comprising ceramic and has a thickness of 1 nm or more and 1000 nm or less, and the pulp recovery rate after re-disintegration of the paper laminate is 80% or more.

<A2> The paper laminate according to <A1>, wherein the undercoat layer, the overcoat layer, and the heat seal layer contain a water-suspendable polymer.

<A3> The paper laminate according to <A1> or <A2>, wherein the undercoat layer, the overcoat layer, and the heat seal layer are formed using an aqueous medium.

<A4> The paper laminate according to any one of <A1> to <A3>, wherein the clay coat layer contains clay and a water-suspendable polymer, and the clay content in the clay coat layer is 68% by mass or more and 90% by mass or less.

<A5> The paper laminate according to any one of <A1> to <A4>, wherein the clay coat layer contains a styrene-acrylic copolymer.

<A6> The paper laminate according to any one of <A1> to <A5>, wherein the overcoat layer contains a polyurethane resin.

<A7> The paper laminate according to any one of <A1> to <A6>, wherein the overcoat layer has a thickness of 0.1 μm or more and 10 μm or less.

<A8> The paper laminate according to any one of <A1> to <A7>, wherein the coating amount of the overcoat layer is 0.1 $g/m^2$ or more and 10 $g/m^2$ or less in terms of solid content.

<A9> The paper laminate according to any one of <A6> to <A8>, wherein the polyurethane resin contained in the overcoat layer has an oxygen permeability at 23° C. and 50% RH when the polyurethane resin is molded into a 25 μm thick sheet of 100 ml/($m^2$·day·atm) or less.

<A10> The paper laminate according to any one of <A6> to <A9>, wherein the polyurethane resin contained in the overcoat layer contains at least one of a constituent unit derived from metaxylylene diisocyanate and a constituent unit derived from hydrogenated metaxylylene diisocyanate.

<A11> The paper laminate according to <A10>, wherein the polyurethane resin contained in the overcoat layer has a total content of the constituent unit derived from metaxylylene diisocyanate and the constituent unit derived from hydrogenated metaxylylene diisocyanate of 50% by mole or more based on the total amount of a constituent unit derived from polyisocyanate.

<A12> The paper laminate according to any one of <A1> to <A11>, wherein the coating amount of the clay coat layer is 5 $g/m^2$ or more and 30 $g/m^2$ or less in terms of solid content.

<A13> The paper laminate according to any one of <A1> to <A12>, wherein the coating amount of the undercoat layer is 0.1 $g/m^2$ or more and 10 $g/m^2$ or less in terms of solid content.

<A14> The paper laminate according to any one of <A1> to <A13>, wherein the undercoat layer contains a polyurethane resin.

<A15> The paper laminate according to <A14>, wherein the polyurethane resin contained in the undercoat layer has an oxygen permeability at 23° C. and 50% RH when the polyurethane resin is molded into a 25 μm thick sheet of 100 ml/($m^2$·day·atm) or less.

<A16> The paper laminate according to <A14> or <A15>, wherein the polyurethane resin contained in the undercoat layer contains at least one of a constituent unit derived from metaxylylene diisocyanate and a constituent unit derived from hydrogenated metaxylylene diisocyanate.

<A17> The paper laminate according to <A16>, wherein the polyurethane resin contained in the undercoat layer has a total content of the constituent unit derived from metaxylylene diisocyanate and the constituent unit derived from hydrogenated metaxylylene diisocyanate of 50% by mole or more based on the total amount of the constituent unit derived from polyisocyanate.

<A18> The paper laminate according to any one of <A1> to <A17>, wherein the content of hardwood pulp in a raw material pulp constituting the paper substrate is 80% by mass or more.

<A19> The paper laminate according to any one of <A1> to <A18>, wherein the vapor deposition layer is at least one of a layer containing aluminum, a layer containing silicon oxide, and a layer containing aluminum oxide.

<A20> The paper laminate according to any one of <A1> to <A19>, wherein the heat seal layer contains at least one selected from the group consisting of a styrene-butadiene copolymer and an olefin-unsaturated carboxylic acid copolymer.

<A21> The paper laminate according to any one of <A2> to <A20>, wherein the heat seal layer further contains at least one of a lubricant and a pigment.

<A22> A method for producing a paper laminate having a clay coat layer, an undercoat layer, a vapor deposition layer, an overcoat layer, and a heat seal layer in this order on at least one surface of a paper substrate, the method including: a step of forming the undercoat layer, the overcoat layer, and the heat seal layer using an aqueous medium.

The second problem of the present invention can be solved by the following configurations <B1> to <B15>.

<B1> A vapor deposition paper having: a coating layer; a vapor deposition layer; and an overcoat layer in this order on one surface of a paper substrate, wherein a Cobb water absorption degree of the surface on the side of the overcoat layer at a temperature of 23° C. for a contact time of 120 seconds measured according to JIS P 8140:1998 is 1.0 $g/m^2$ or less, a Cobb water absorption degree of the surface on the side opposite to the side of the overcoat layer at a temperature of 23° C. for a contact time of 120 seconds measured according to JIS P 8140:1998 is 10 $g/m^2$ or more, the surface specific electrical resistance of the surface on the side of the overcoat layer measured according to JIS C 2139:2008 is $1.0×10^{12}$ Ω or more, and, when a laminated sheet is formed by laminating a 20 μm thick unstretched polypropylene film on the overcoat layer of the vapor deposition paper, the oxygen permeability of the laminated sheet at a temperature of 23° C. and a relative humidity of 50% measured according to JIS K 7126-2:2006 is 2.0 mL/$m^2$·day·atm or less.

<B2> The vapor deposition paper according to <B1>, wherein the water vapor permeability at a temperature of 40° C. and a relative humidity of 90% measured according to JIS Z 0208:1976 (cup method), B method is 1.0 $g/m^2$·day or less.

<B3> The vapor deposition paper according to <B1> or <B2>, wherein the coating layer has a clay coat layer and an undercoat layer in this order from the side of the paper substrate.

<B4> The vapor deposition paper according to <B3>, wherein the undercoat layer and the overcoat layer contain a water-suspendable polymer.

<B5> The vapor deposition paper according to <B4>, wherein the water-suspendable polymer contained in the undercoat layer and the overcoat layer contains one or more selected from the group consisting of a polyester resin and a polyurethane resin.

<B6> The vapor deposition paper according to <B5>, wherein the polyurethane resin has an oxygen permeability at 23° C. and 50% RH when the polyurethane resin is molded into a 25 μm thick sheet of 100.0 mL/($m^2$·day·atm) or less.

<B7> The vapor deposition paper according to <B5> or <B6>, wherein the polyurethane resin contains at least one selected from the group consisting of a constituent unit derived from metaxylylene diisocyanate and a constituent unit derived from hydrogenated metaxylylene diisocyanate.

<B8> The vapor deposition paper according to any one of <B5> to <B7>, wherein the polyurethane resin has a hydroxy group and a hydroxy value of 50 mgKOH/g or more.

<B9> The vapor deposition paper according to any one of <B5> to <B8>, wherein the polyurethane resin has a total content of the constituent unit derived from metaxylylene diisocyanate and the constituent unit derived from hydrogenated metaxylylene diisocyanate of 50% by mole or more based on the total amount of a constituent unit derived from polyisocyanate.

<B10> The vapor deposition paper according to any one of <B3> to <B9>, wherein the clay coat layer contains an inorganic pigment and a binder, and the inorganic pigment has an aspect ratio of 50 or less and a mean particle size of 5 μm or less.

<B11> The vapor deposition paper according to <B10>, wherein the inorganic pigment is kaolin.

<B12> The vapor deposition paper according to <B10> or <B11>, wherein the binder contained in the clay coat layer contains one or more selected from the group consisting of a styrene-butadiene resin, a styrene-(meth)acrylic resin, an olefin-unsaturated carboxylic acid copolymer, and polylactic acid.

<B13> The vapor deposition paper according to any one of <B1> to <B12>, wherein the overcoat layer has a thickness of less than 1 μm.

<B14> The vapor deposition paper according to any one of <B1> to <B13>, wherein the vapor deposition layer is a vapor deposition layer containing inorganic oxide, and the inorganic oxide contains at least one selected from the group consisting of silicon oxide and aluminum oxide.

<B15> The vapor deposition paper according to any one of <B1> to <B14>, wherein the vapor deposition layer has a thickness of 1 nm or more and 100 nm or less.

DESCRIPTION OF EMBODIMENTS

Hereinafter, embodiments of the present invention are described in detail. A description of the constituent elements given below is sometimes made based on representative embodiments or specific examples, but the present invention is not limited to such embodiments. In this specification, a numerical range expressed using "to" means a range containing the numerical values described before and after "to" as the lower limit value and the upper limit value. When the numerical ranges are described stepwise, the upper limit and the lower limit of each numerical range can be optionally combined. In this specification, "(meth)acryl" is a generic term containing both acryl and methacryl.

Vapor Deposition Paper (First Embodiment)

A vapor deposition paper of a first embodiment comprises: a clay coat layer; an undercoat layer; a vapor deposition layer; an overcoat layer; and a heat seal layer in this order on at least one surface of a paper substrate, wherein the vapor deposition layer contains at least one selected from the group consisting of metal and ceramic and has a thickness of 1 nm or more and 1000 nm or less, and a pulp recovery rate after re-disintegration of the vapor deposition paper is 80% or more. The vapor deposition paper of the first embodiment has barrier properties and excellent recyclability. The vapor deposition paper has heat sealability, and thus can be suitably used as a packaging material.

In this specification, "having a layer B on a layer A" means that an aspect may be acceptable in which the layer A and the layer B are directly laminated or an aspect may be acceptable in which the layer A and the layer B are laminated via another layer. The vapor deposition paper of this embodiment may have other layers in addition to the paper substrate, the clay coat layer, the undercoat layer, the vapor deposition layer, the overcoat layer, and the heat seal layer.

The vapor deposition paper of the first embodiment may have a vapor deposition layer on only one surface of the paper substrate or may have a vapor deposition layer on each surface of the paper substrate, and preferably has the vapor deposition layer only on one surface from the viewpoint of production efficiency. In this embodiment, even when the vapor deposition layer is provided only one surface, sufficient barrier properties can be exhibited. When the vapor deposition layer is provided on only one surface, the overcoat layer and/or the heat seal layer may be provided only on the side of the vapor deposition layer. When the vapor deposition layer is provided on one surface from the viewpoint of production efficiency, the paper substrate may be the outermost layer in the vapor deposition paper of this embodiment.

Vapor Deposition Paper (Second Embodiment)

A vapor deposition paper of a second embodiment has a coating layer which can contain a clay coat layer and an undercoat layer, a vapor deposition layer, and an overcoat layer in this order on one surface of a paper substrate, wherein a Cobb water absorption degree of the surface on the side of the overcoat layer at a temperature of 23° C. for a contact time of 120 seconds measured according to JIS P 8140:1998 is 1.0 g/m$^2$ or less, a Cobb water absorption degree of the surface on the side opposite to the side of the overcoat layer at a temperature of 23° C. for a contact time of 120 seconds measured according to JIS P 8140:1998 is 10 g/m$^2$ or more, the surface specific electrical resistance of the surface on the side of the overcoat layer measured according to JIS C 2139:2008 is $1.0 \times 10^{12} \Omega$ or more, and, when a laminated sheet is formed by laminating a 20 μm thick unstretched polypropylene film on the overcoat layer of the vapor deposition paper, the oxygen permeability of the laminated sheet at a temperature of 23° C. and a relative humidity of 50% measured according to JIS K 7126-2:2006 is 2.0 mL/m$^2$·day·atm or less. The vapor deposition paper of the second embodiment has excellent barrier properties (oxygen barrier properties, water vapor barrier properties) and recyclability. The mechanism by which the effect is exhibited is unknown, but the mechanism is assumed as follows.

By setting the Cobb water absorption degree of the surface on the side of the overcoat layer of the vapor deposition paper to 1.0 g/m$^2$ or less, a water-impermeable film with few defects can be formed, and therefore high barrier properties can be obtained. By setting the Cobb water absorption degree of the surface on the side opposite to the side of the overcoat layer to 10 g/m$^2$ or more, the permeation of water is facilitated in disintegration, and thus high recyclability can be obtained. By setting the surface specific electrical resistance of the surface on the side of the overcoat layer to $1.0 \times 10^{12} \Omega$ or more, metal foreign matter is reduced, and therefore high recyclability can be obtained. By setting the oxygen permeability at a temperature of 23° C. and a relative humidity of 50% to 2.0 mL/m$^2$·day·atm or less, high barrier properties suitable for food packaging can be obtained. For these reasons, the vapor deposition paper of the second embodiment can exhibit excellent barrier properties and recyclability. The mechanism is based on the assumption, and the mechanism by which the effect is exhibited is not limited thereto.

In the second embodiment, the vapor deposition paper has the coating layer, the vapor deposition layer, and the overcoat layer in this order on at least one surface of the paper substrate, and the coating layer preferably has the clay coat layer and the undercoat layer in this order from the side of the paper substrate. In this case, the clay coat layer and the undercoat layer may be provided in this order on one surface of the paper substrate, and the clay coat layer and the undercoat layer may be provided in this order on each surface. However, from the viewpoint of production efficiency, the clay coat layer and the undercoat layer are preferably provided in this order on one surface. The vapor deposition layer preferably contains inorganic oxide, preferably contains at least one selected from the group consisting of silicon oxide (silica) and aluminum oxide (alumina), and preferably contains silicon oxide (silica). From the viewpoint of recyclability, the vapor deposition paper preferably has the coating layer, the vapor deposition layer, and the overcoat layer in this order on at least one surface of the paper substrate, and more preferably does not have anything laminated on the other surface of the paper substrate.

[Paper Base]

The paper substrate in each of the first embodiment and the second embodiment is preferably a commonly used paper containing pulp derived from plants as a main component and more preferably a paper containing wood pulp as a main component. The paper substrate used for the vapor deposition paper of this embodiment is preferably a paper containing pulp as a main component, the pulp which is easily dispersed in water by a mechanical disintegration action.

Examples of the pulp include, for example, wood pulp, such as softwood pulp and hardwood pulp; and non-wood pulp, such as cotton pulp, hemp pulp, kenaf pulp, and bamboo pulp. The pulp above may be used alone or in combination of two or more kinds thereof. Materials other than pulp fibers, such as synthetic fibers, e.g., rayon fibers, nylon fibers, and the like, may also be compounded as a secondary paper material insofar the effects of the invention are not impaired.

In particular, the hardwood pulp is preferably used. In this case, the content of the hardwood pulp in the raw material pulp constituting the paper substrate may be 65% by mass or more, preferably 80% by mass or more, more preferably 90% by mass or more, and still more preferably 95% by mass or more (upper limit: 100% by mass or less). The hardwood pulp has short and rigid fibers, and therefore the use of paper substrates having the hardwood pulp content within the ranges above facilitates the disintegration and is effective for recyclability.

Examples of the paper substrate used for the vapor deposition paper specifically include bleached kraft paper, unbleached kraft paper, woodfree paper, paperboard, liner paper, coated paper, one side glossy paper, glassine paper, graphan paper, and the like. Among the above, bleached kraft paper, unbleached kraft paper, woodfree paper, and one side glossy paper are preferable.

The disintegration freeness (drainage rate) measured according to JIS P 8121-2:2012 of the paper substrate is preferably set to 800 ml or less and more preferably 500 ml or less from the viewpoint of improving the barrier properties. The lower limit is not particularly limited, and is preferably 150 ml or more and more preferably 250 ml or more from the viewpoint of ease of papermaking. The disintegration freeness as used herein is the Canadian standard freeness obtained by measuring pulp according to JIS P 8121-2:2012, the pulp being obtained by disintegrating paper after papermaking according to JIS P 8220-1:2012. As a method for beating the pulp to adjust the disintegration freeness, known methods are usable.

The sizing degree of the paper substrate is not particularly limited. From the viewpoint of improving the barrier properties, the Stockigt sizing degree according to JIS P 8122:2004 is preferably set to 1 second or more. The upper limit is not particularly limited, and is preferably 100 seconds or less and more preferably 30 seconds or less. The sizing degree of the paper substrate can be controlled by the type and the content of internal sizing agents, the pulp type, smoothing treatment, and the like.

Examples of the internal sizing agents include a rosin type, an alkyl ketene dimer type, an alkenyl succinic anhydride type, a styrene-unsaturated carboxylic acid type, a higher fatty acid type, a petroleum resin type, and the like. The content of the internal sizing agent is not particularly limited, and is preferably 0 parts by mass or more, and preferably 3 parts by mass or less based on 100 parts by mass of the pulp of the paper substrate.

Besides the internal sizing agent, other known internal additives may be added to the paper substrate. Examples of the internal additives include fillers, paper strengthening agents, yield improving agents, pH adjusters, freeness improving agents, waterproofing agents, softeners, antistatic agents, antifoaming agents, slime control agents, dyes/pigments, and the like.

Examples of the fillers include titanium dioxide, kaolin, talc, calcium carbonate (heavy calcium carbonate, light calcium carbonate), calcium sulfite, gypsum, calcined kaolin, white carbon, amorphous silica, delaminated kaolin, diatomaceous earth, carbonate magnesium, aluminum hydroxide, calcium hydroxide, magnesium hydroxide, zinc hydroxide, and the like.

The paper substrate is obtained by making a papermaking raw material containing a pulp slurry as a main component into paper.

The pulp slurry is obtained from wood or non-wood raw material chips through steps of cooking, washing, bleaching, and the like. Methods in the cooking step, the washing step, the bleaching step, and the like are not particularly limited. The pulp slurry obtained through these steps is further beaten in the presence of water. Examples of the pulp include the substances described above.

In the papermaking of the paper substrate, known wet papermaking machines can be selected and used as appropriate.

Examples of the papermaking machines include fourdrinier papermaking machines, gap former papermaking machines, cylinder papermaking machines, short-fourdrinier papermaking machines, and the like. A paper layer formed by the papermaking machines is preferably conveyed by felt and dried by a drier, for example. Before drying, a multistage cylinder dryer may be used as a pre-dryer.

The paper substrate obtained as described above may be surface-treated with a calendar to uniformize the paper thickness and the gloss profile. For the calendering, known calendering machines can be selected and used as appropriate.

The basis weight of the paper substrate is not particularly limited, and is preferably 20 g/m$^2$ or more, more preferably 30 g/m$^2$ or more, and still more preferably 40 g/m$^2$ or more, and is preferably 500 g/m$^2$ or less, more preferably 400 g/m$^2$ or less, still more preferably 200 g/m$^2$ or less, and yet still more preferably 100 g/m$^2$ or less. The basis weight of the paper substrate is measured according to JIS P 8124:2011.

The thickness of the paper substrate is not particularly limited, and is preferably 5 μm or more, more preferably 10 μm or more, and still more preferably 20 μm or more, and is preferably 150 μm or less, more preferably 100 μm or less, and still more preferably 75 μm or less. The thickness of the paper substrate is measured according to JIS P 8118:2014.

From the viewpoint of moldability, the paper substrate has a density of preferably 0.5 g/cm$^3$ or more and more preferably 0.6 g/cm$^3$ or more, and is preferably 1.2 g/cm$^3$ or less and more preferably 1.0 g/cm$^3$ or less. The density of the paper substrate is calculated from the thickness of the paper substrate measured according to JIS P 8118:2014 and the basis weight described above.

From the viewpoint of obtaining a uniform vapor deposition layer, the paper substrate has the Oken smoothness of at least the surface on which the vapor deposition layer is provided of the paper substrate of preferably 5 seconds or more, more preferably 10 seconds or more, still more preferably 100 seconds or more, and particularly preferably 300 seconds or more. The upper limit is not particularly limited, and is 2000 seconds or less and preferably 1000 seconds or less, for example. The Oken smoothness of the paper substrate is measured according to JIS P 8155:2010.

[Clay Coat Layer]

The vapor deposition paper can have the clay coat layer between the paper substrate and the undercoat layer described below. Thus, the paper substrate can be filled and smoothed. This enables the formation of a uniform vapor deposition layer, improving the barrier properties.

The clay coat layer is preferably formed by applying an aqueous coating liquid in which an inorganic pigment and a binder are dispersed in an aqueous medium, followed by drying. By forming the clay coat layer as described above, the clay coat layer having a high filling effect can be obtained. Further, the components of the clay coat layer are re-dispersed in water in re-disintegration, and thus the pulp can be recovered at a high recovery rate (i.e., the vapor deposition paper is imparted with excellent recyclability). Therefore, in the vapor deposition paper, the clay coat layer is preferably formed by applying an inorganic pigment and a coating liquid in which a binder is dispersed in an aqueous medium, and preferably contains an inorganic pigment and the binder. Further, the binder is preferably a water-suspendable polymer.

The "water-suspendable polymer" as used herein refers to a polymer which is not water-soluble (specifically, solubility in 25° C. water of 10 g/L or less), but is finely dispersed in water, such as an emulsion or a suspension. The "aqueous medium" refers to a medium containing water in a proportion of 50% by mass or more, preferably 70% by mass or more, and more preferably 90% by mass or more (upper limit: 100% by mass or less).

The clay coat layer preferably contains an inorganic pigment and a binder, and more preferably mainly contains an inorganic pigment and a binder. The "clay coat layer mainly contains an inorganic pigment and a binder" means that the total content of the inorganic pigment and the binder in the clay coat layer is preferably 50% by mass or more, more preferably 60% by mass or more, more preferably 70% by mass or more, still more preferably 80% by mass or more, yet still more preferably 90% by mass or more, and particularly preferably 95% by mass or more (upper limit: 100% by mass or less). The clay coat layer may further contain optional components other than the inorganic pigment and the binder.

The inorganic pigment contained in the clay coat layer is not particularly limited, and includes clay, such as kaolin, talc, and mica, metal oxides, and the like with clay being preferable. The aspect ratio of the inorganic pigment is usually 1 or more, preferably 10 or more, more preferably 20 or more, and still more preferably 30 or more. The upper limit is not particularly limited, and is preferably 10000 or less, and, from the viewpoint of forming a uniform and smooth undercoat layer and the viewpoint of improving the disintegration properties of a base paper for vapor deposition paper in recovery by being finely scattered in the clay coat layer, is preferably 50 or less and more preferably 40 or less. The aspect ratio can be measured by electron microscope observation or X-ray diffraction measurement.

The mean particle size of the inorganic pigment is preferably 5 μm or less, more preferably 3 μm or less, and still more preferably 1 μm or less from the viewpoint of forming a uniform and smooth undercoat layer and the viewpoint of improving the disintegration properties of the base paper for vapor deposition paper in recovery by being finely scattered in the clay coat layer. The lower limit is not particularly limited, and is preferably 0.05 μm or more and more preferably 0.10 μm or more. The mean particle size means the median diameter (d50) as measured by laser diffraction scattering particle size distribution measurement.

The content of the inorganic pigment in the clay coat layer is usually 50% by mass or more, may be 60% by mass or more, preferably 68% by mass or more, and more preferably 70% by mass or more from the viewpoint of recyclability, and is preferably 98% by mass or less, more preferably 95% by mass or less, still more preferably 90% by mass or less, and still more preferably 85% by mass or less from the viewpoint of enhancing the close contact property with the paper substrate and the undercoat layer and further improving the barrier properties.

When the binder contained in the clay coat layer is the water-suspendable polymer, the glass transition temperature of the water-suspendable polymer is preferably 20° C. or less and more preferably 10° C. or less, and preferably –5° C. or more from the viewpoint of recyclability. For the glass transition temperature of the water-suspendable polymer, a value measured by Testing methods for transition temperatures of plastics (JIS K 7121:2012) is adopted.

Examples of the binder contained in the clay coat layer include, but not particularly limited to, styrene-butadiene resins; (meth) acrylic (co) polymers; styrene-(meth) acrylic resins; olefin-unsaturated carboxylic acid copolymers, such as ethylene-acrylic acid copolymers and ethylene-methacrylic acid copolymers; polylactic acids, and the like. The binder preferably contains one or more selected from the group consisting of styrene-butadiene resins, styrene- (meth) acrylic resins, olefin-unsaturated carboxylic acid copolymers, and polylactic acids and more preferably contains one or more selected from the group consisting of styrene-(meth) acrylic resins, ethylene-(meth) acrylic acid copolymers, and polylactic acids.

The (meth)acrylic (co) polymers are (co) polymers of one or more monomers selected from (meth)acrylic acids and (meth)acrylic acid esters. The (meth)acrylic acid esters are not particularly limited, and are preferably alkyl esters having 1 to 12 carbon atoms of (meth)acrylic acids. The styrene-(meth)acrylic resins are copolymers of styrene and at least one monomer selected from (meth)acrylic acids and (meth)acrylic acid esters.

The binder content in the clay coat layer is usually 50% by mass or less, and may be 40% by mass or less, and is preferably 32% by mass or less, and more preferably 30% by mass or less from the viewpoint of recyclability, and is preferably 2% by mass or more, more preferably 5% by mass or more, still more preferably 10% by mass or more, and yet still more preferably 15% by mass or more from the viewpoint of enhancing the close contact property with the paper substrate and the undercoat layer and further improving the barrier properties.

Examples of the optional components which the clay coat layer may contain include dispersants, surfactants, antioxidants, antistatic agents, dyes, plasticizers, lubricants, release agents, and the like.

The coating amount (solid content) of the clay coat layer is preferably 5 g/m² or more, and more preferably 7 g/m² or more from the viewpoint of enhancing the filling effect, and is preferably 30 g/m² or less, and more preferably 20 g/m² or less from the viewpoint of recyclability.

A method for forming the clay coat layer is not particularly limited, and a method is preferable which includes applying a dispersion liquid containing an inorganic pigment and a binder onto a paper substrate, followed by drying. The dispersion liquid containing an inorganic pigment and a binder is preferably one containing the aqueous medium, such as an aqueous dispersion liquid, as a solvent.

11 12

[Undercoat Layer]

The vapor deposition paper can have the undercoat layer between the clay coat layer and the vapor deposition layer described below. By providing the undercoat layer, the close contact property of the vapor deposition layer and the paper substrate is improved, and the barrier properties are improved. The undercoat layer has the oxygen barrier properties and the water vapor barrier properties, and thus has a function of improving the barrier properties of the vapor deposition paper.

The undercoat layer preferably contains the water-suspendable polymer and more preferably mainly contains the water-suspendable polymer. It is considered that, by the formation of the undercoat layer using a water-suspendable polymer, a vapor deposition paper can be obtained which has improved close contact property with the vapor deposition layer and excellent barrier properties (oxygen barrier properties, water vapor barrier properties).

The undercoat layer is preferably formed by applying an aqueous coating liquid in which the water-suspendable polymer is dispersed in the aqueous medium, followed by drying. By forming the undercoat layer as described above, the components of the undercoat layer are re-dispersed in water in re-disintegration, and thus the pulp can be recovered at a high recovery rate (i.e., the vapor deposition paper is imparted with excellent recyclability). Therefore, in the vapor deposition paper, the undercoat layer is preferably formed by applying a coating liquid in which the water-suspendable polymer is dispersed in the aqueous medium, and preferably contains the water-suspendable polymer.

The "undercoat layer mainly contains the water-suspendable polymer" means that the content of the water-suspendable polymer in the undercoat layer is preferably 50% by mass or more, more preferably 60% by mass or more, still more preferably 70% by mass or more, yet still more preferably 80% by mass or more, even yet still more preferably 90% by mass or more, and particularly preferably 95% by mass or more (upper limit: 100% by mass or less). The undercoat layer may further contain optional components other than the water-suspendable polymer.

Examples of the water-suspendable polymer contained in the undercoat layer include, but not particularly limited to, alkyd resins; (meth)acrylic (co) polymers and styrene-(meth)acrylic resins; olefin-unsaturated carboxylic acid copolymers, such as ethylene-acrylic acid copolymers and ethylene-methacrylic acid copolymers; vinyl alcohol resins, such as polyvinyl alcohols and ethylene vinyl alcohol copolymers (ethylene-modified polyvinyl alcohols); cellulose resins; polyurethane resins; polyester resins; polylactic acids, and the like. Among the above, the water-suspendable polymer is preferably one or more selected from vinyl alcohol resins, polyurethane resins, polyester resins, and polylactic acids, and is more preferably one or more selected from the group consisting of polyester resins, polyurethane resins, and polylactic acids, still more preferably one or more selected from the group consisting of polyurethane resins and polylactic acids, yet still more preferably one or more selected from the group consisting of polyester resins and polyurethane resins, and even yet still more preferably polyurethane resins from the viewpoint of further improving the biodegradability and the recyclability.

The polyester resin contained in the undercoat layer is not particularly limited, and is more preferably a polyester resin which can be prepared into one or more selected from the group consisting of, for example, a polyester resin dispersion and a polyester resin emulsion, still more preferably a polyester resin which can be prepared into a polyester resin dispersion or a polyester resin emulsion, and still more preferably a polyester resin which can be prepared into a polyester resin dispersion.

As the polyester resin, commercially available products may be used, and, for example, Elitel KT series (trade name) manufactured by UNITIKA LTD., Landy PL series (trade name) manufactured by MIYOSHI OIL & FAT CO., LTD, and the like are described. Specifically, Elitel KT-8803 and Landy PL-3000 are described as examples.

The polyurethane resin contained in the undercoat layer is not particularly limited, and is more preferably a polyurethane resin which can be prepared into one or more selected from the group consisting of, for example, a polyurethane resin dispersion and a polyurethane resin emulsion, still more preferably a polyurethane resin which can be prepared into a polyurethane resin dispersion or a polyurethane resin emulsion, and still more preferably a polyurethane resin which can be prepared into a polyurethane resin dispersion.

The polyurethane resin can be produced by known production methods. For example, the polyurethane resin can be obtained by a reaction of polyisocyanate compounds (e.g., diisocyanate compound) and polyhydroxy acids (e.g., dihydroxy acid). Further, in addition to the polyisocyanate compounds and the polyhydroxy acids described above, the polyurethane resin can also be obtained by a reaction of polyol compounds (e.g., polyester polyol and polyether polyol) and/or chain extenders, for example.

The polyurethane resin contained in the undercoat layer has an oxygen permeability at 23° C. and 50% RH when the polyurethane resin is molded into a 25 μm thick sheet of preferably $100.0 \ mL/(m^2 \cdot day \cdot atm)$ or less, more preferably $50.0 \ mL/(m^2 \cdot day \cdot atm)$ or less, still more preferably $25.0 \ mL/(m^2 \cdot day \cdot atm)$ or less, yet still more preferably $10.0 \ mL/(m^2 \cdot day \cdot atm)$ or less, and particularly preferable $3.0 \ mL/(m^2 \cdot day \cdot atm)$ or less. The oxygen permeability at 23° C. and a relative humidity of 50% when the polyurethane resin is molded into a 25 μm thick sheet may be $0 \ mL/(m^2 \cdot day \cdot atm)$.

The oxygen permeability when the polyurethane resin is molded into a 25 μm thick sheet refers to the oxygen permeability measured using a 25 μm thick sheet formed using the target polyurethane resin. In this specification, the oxygen permeability is measured using an oxygen permeability meter (OX-TRAN2/22 manufactured by MOCON, Inc.) under the conditions of 23° C. and 50% RH according to JIS K 7126-2:2006.

The polyurethane resin contained in the undercoat layer preferably contains at least one selected from the group consisting of a constituent unit derived from metaxylylene diisocyanate and a constituent unit derived from hydrogenated metaxylylene diisocyanate. The constituent unit derived from metaxylylene diisocyanate refers to a monomer unit in which metaxylylene diisocyanate has reacted in a polyurethane resin. The monomer unit refers to a form in which monomer substances in a polymer have reacted.

When the polyurethane resin contains at least one of the constituent unit derived from metaxylylene diisocyanate and the constituent unit derived from hydrogenated metaxylylene diisocyanate, the total content of the constituent unit derived from metaxylylene diisocyanate and the constituent unit derived from hydrogenated metaxylylene diisocyanate based on the total amount of a constituent unit derived from polyisocyanate is preferably 50% by mole or more and more preferably 60% by mole or more. The upper limit is not particularly limited, and is preferably 95% by mole or less and more preferably 90% by mole or less. Such a polyurethane resin has excellent gas barrier properties because high cohesion is exhibited due to hydrogen bonding and stacking effects between xylylene groups. The content can be identified using known analytical techniques, such as $^1$H-NMR.

The polyurethane resin may have a hydroxy group, and the hydroxy value thereof is preferably 50 mgKOH/g or more, more preferably 100 mgKOH/g or more, and still more preferably 150 mgKOH/g or more. The upper limit of the hydroxy value is not particularly limited, and is preferably 1000 mgKOH/g or less, more preferably 800 mgKOH/g or less, and still more preferably 600 mgKOH/g or less. The hydroxy value of the polyurethane resin preferably falls within the ranges above because the oxygen barrier properties are excellent. The hydroxy value is measured according to JIS K 0070-1992, and, when 1 g of a sample is acetylated, the mg amount of potassium hydroxide required to neutralize acetic acid bonded to the hydroxy group is measured.

The glass transition temperature of the polyurethane resin is preferably 150° C. or less, more preferably 140° C. or less, and particularly preferably 135° C. or less because high film formability is important from the viewpoint of protecting the vapor deposition layer of the vapor deposition paper described later. The glass transition temperature is measured according to JIS K 7122:2012.

As the polyurethane resin, synthetic products may be used, and a polyurethane resin described in International Publication No. WO 2015/016069 and the like are described, for example.

As the polyurethane resin, commercially available products may be used, and, for example, "Takelac W series (trade name)", "Takelac WPB series (trade name)", and "Takelac WS series (trade name)" manufactured by Mitsui Chemicals, Inc. and the like are described and specifically, Takelac WPB-341 is described as an example. Examples of other commercially available products include "HPU W-003" (hydroxy value of 235 mg KOH/g) manufactured by Dainichiseika Color & Chemicals Mfg. Co., Ltd. and the like.

From the viewpoint of improving the bending resistance of the undercoat layer, the undercoat layer preferably contains a silane coupling agent and/or a reaction product thereof in addition to the water-suspendable polymer described above, and is more preferably obtained by compounding the silane coupling agent.

The silane coupling agent is a compound having at least one alkoxysilyl group and at least one reactive functional group other than the alkoxysilyl group in the molecule. The alkoxysilyl group may be any of a monoalkoxysilyl group, a dialkoxysilyl group, and a trialkoxysilyl group, but is preferably a trialkoxysilyl group from the viewpoint of reactivity.

Examples of the reactive functional groups other than the alkoxysilyl group include vinyl groups, epoxy groups, styryl groups, (meth)acryloyloxy groups, amino groups, isocyanato groups, ureido groups, and acid anhydride groups. Among the above, amino groups, epoxy groups, and acid anhydride groups are preferable, and amino groups are more preferable.

Examples of epoxy group-containing silane coupling agents include 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like.

Examples of amino group-containing silane coupling agents include 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, 3-triethoxysilyl-N-(1,3- dimethylbutylidene) propylamine, N-phenyl-3-aminopropyltrimethoxysilane, and the like. Among the above, 3-aminopropyltriethoxysilane is preferable.

Examples of acid anhydride group-containing silane coupling agents include 3-trimethoxysilylpropylsuccinic anhydride and the like.

As the silane coupling agents, commercially available products may be used. For example, KBM-303, KBM-402, KBM-403, KBE-402, KBE-403, KBM-602, KBM-603, KBM-903, KBE-903, KBE-9103P, KBM-573, and X-12-967C manufactured by Shin-Etsu Chemical Co., Ltd. and the like are described as examples.

The compounding amount of the silane coupling agents in the undercoat layer is preferably 0.03 parts by mass or more, more preferably 0.1 parts by mass by mass or more, still more preferably 0.2 parts by mass or more, and particularly preferably 0.3 parts by mass or more, and is preferably 10 parts by mass or less, more preferably 8 parts by mass or less, still more preferably 6 parts by mass or less, still more preferably 5 parts by mass or less, and particularly preferably 1 part by mass or less based on 100 parts by mass of the water-suspendable polymer.

The undercoat layer may further contain optional components in addition to the water-suspendable polymer and the silane coupling agent. Examples of the optional components include dispersants, surfactants, pigments, antioxidants, antistatic agents, dyes, plasticizers, lubricants, mold release agents, and the like.

The coating amount of the undercoat layer (solid content) is more preferably 0.1 g/m$^2$ or more, and more preferably 1 g/m$^2$ or more from the viewpoint of the adhesiveness between the paper substrate and the vapor deposition layer, and is preferably 10 g/m$^2$ or less, and more preferably 5 g/m$^2$ or less from the viewpoint of recyclability.

A method for forming the undercoat layer is not particularly limited, and the undercoat layer is preferably formed by applying an aqueous solution of the water-suspendable polymer or the aqueous medium, such as an aqueous dispersion liquid, followed by drying.

[Vapor Deposition Layer]

The vapor deposition paper has the vapor deposition layer on the undercoat layer. By providing the vapor deposition layer, the barrier properties (water vapor barrier properties, oxygen barrier properties) are improved. From the viewpoint of recyclability, the vapor deposition layer containing inorganic oxide is preferable.

The vapor deposition layer contains at least one selected from the group consisting of metal and ceramic. More specifically, the vapor deposition layer may be any of a layer containing metal, a layer containing ceramic, and a laminate of a metal layer and a ceramic layer. When the vapor deposition layer is the laminate of a metal layer and a ceramic layer, the metal layer may be located on the side of the undercoat layer, the ceramic layer may be located on the side of the undercoat layer, and the location is not particularly limited.

The thickness of the vapor deposition layer is usually 1 nm or more, preferably 3 nm or more, more preferably 5 nm or more, still more preferably 10 nm or more, may be 20 nm or more, and may be 30 nm or more from the viewpoint of barrier properties. From the viewpoint of processing resistance (e.g., barrier properties after folding) and cost, the thickness is usually 1000 nm or less, preferably 500 nm or less, more preferably 100 nm or less, may be 50 nm or less, and may be 20 nm or less.

The vapor deposition layer may be a layer containing metal, a layer containing ceramic, or a laminate thereof, and the layer containing metal is preferable.

When the vapor deposition layer contains metal, specific examples of the metal include aluminum, titanium, and the like. These substances may be used alone or in combination of two or more kinds thereof. Among the above, aluminum is preferable.

When the vapor deposition layer contains ceramic, specific examples of ceramic include inorganic oxide. The inorganic oxide is not particularly limited, and preferably includes at least one selected from the group consisting of silicon oxide (silica) and aluminum oxide (alumina). The vapor deposition layer may contain silicon oxide (silica) and aluminum oxide (alumina). When silicon oxide and aluminum oxide are used in combination, the mixing ratio (silicon oxide: aluminum oxide) is preferably 1:10 to 10:1 and more preferably from 1:2 to 2:1 on a mass basis. The vapor deposition layer is more preferably a silicon oxide vapor deposition layer, an aluminum oxide vapor deposition layer, or a vapor deposition layer containing a mixture of silicon oxide and aluminum oxide.

The vapor deposition layer is more preferably any of a layer containing aluminum, a layer containing silicon oxide, a layer containing titanium oxide, a layer containing aluminum oxide, and a laminate thereof, still more preferably a layer containing aluminum, a layer containing silicon oxide, a layer containing aluminum oxide, and a laminate thereof, and particularly preferably a layer containing aluminum.

The vapor deposition layer can be formed by known vapor deposition methods, such as a vacuum vapor deposition method and a chemical vapor deposition method.

[Overcoat Layer]

The vapor deposition paper has the overcoat layer on the vapor deposition layer. By providing the overcoat layer, the vapor deposition layer can be protected and a loss of the barrier properties due to breakage of the vapor deposition layer can be prevented. Further, due to the fact that the overcoat layer has the oxygen barrier properties and the water vapor barrier properties, the barrier properties of the vapor deposition paper are further improved.

The overcoat layer is preferably formed by applying an aqueous coating liquid in which the water-suspendable polymer is dispersed in the aqueous medium, followed by drying. By forming the overcoat layer as described above, the components of the overcoat layer are re-dispersed in water in re-disintegration, and thus the pulp can be recovered at a high recovery rate (i.e., the vapor deposition paper is imparted with excellent recyclability). Further, it is considered that the close contact property with the vapor deposition layer is improved, so that the vapor deposition paper having excellent barrier properties (oxygen barrier properties, water vapor barrier properties) is obtained. More specifically, the overcoat layer preferably contains the water-suspendable polymer.

The content of the water-suspendable polymer in the overcoat layer is usually 50% by mass or more, may be 60% by mass or more, may be 70% by mass or more, preferably 80% by mass or more, more preferably 90% by mass or more, still more preferably 95% by mass or more, and yet still more preferably 99% by mass or more. The upper limit is not particularly limited and is 100% by mass or less. The overcoat layer may further contain optional components other than the water-suspendable polymer.

Specific examples of the water-suspendable polymer contained in the overcoat layer include the substances described as examples of the water-suspendable polymer contained in the undercoat layer. In particular, one or more selected from the group consisting of polyester resins and polyurethane resins is preferable, and polyurethane resins are more preferable. Due to the fact that the overcoat layer containing a polyurethane resin is provided on the vapor deposition layer, the oxygen barrier properties can be further improved. Further, the vapor deposition layer is less likely to be damaged by processing, such as folding, and, even when damaged, the oxygen barrier properties can be secured by the overcoat layer, and thus the excellent oxygen barrier properties can be maintained. For preferable physical properties of the overcoat layer, the description of the undercoat layer can also be referred to.

The overcoat layer constituting the vapor deposition paper may contain a silane coupling agent and/or a reaction product thereof from the viewpoint of bending resistance. For a description of the silane coupling agent, the description in the undercoat layer can be referred to.

The overcoat layer may further contain optional components in addition to the water-suspendable polymer. Examples of the optional components include dispersants, surfactants, pigments, antioxidants, antistatic agents, dyes, plasticizers, lubricants, mold release agents, and the like.

From the viewpoint of protecting the vapor deposition layer, the thickness of the overcoat layer is preferably 0.1 μm or more, more preferably 0.2 μm or more, and particularly preferably 0.3 μm or more, and is preferably 10 μm or less, more preferably 5 μm or less, particularly preferably 2 μm or less, may be 1 μm or less, and may be 0.6 μm or less from the viewpoint of recyclability.

The coating amount (solid content) of the overcoat layer is preferably 0.1 g/m² or more, more preferably 0.2 g/m² or more, and particularly preferably 0.3 g/m² or more from the viewpoint of protecting the vapor deposition layer, and is preferably 10 g/m² or less, more preferably 5 g/m² or less, still more preferably 3 g/m² or less, and particularly preferably 2 g/m² or less from viewpoint of recyclability.

[Heat Seal Layer]

The vapor deposition paper can have the heat seal layer on the overcoat layer. By providing the heat seal layer, packaging bags and the like containing only the vapor deposition paper can be easily obtained. By fusing the vapor deposition paper to other sheets, films, containers, or the like, the vapor deposition paper can be used as a packaging container body, a lid of a packaging container, and the like. The packaging bags and the packaging containers thus obtained are excellent in barrier properties. From the viewpoint of enhancing the recyclability, an aspect in which the heat seal layer is not provided may be acceptable.

The heat seal layer is preferably formed by applying an aqueous coating liquid in which the water-suspendable polymer is dispersed in the aqueous medium, followed by drying. By forming the heat seal layer as described above, the components of the heat seal layer are re- dispersed in water in re-disintegration, and thus the pulp can be recovered at a high recovery rate (i.e., the vapor deposition paper is imparted with excellent recyclability). Therefore, in the vapor deposition paper of this embodiment, the heat seal layer is preferably formed using the aqueous medium, and preferably contains the water-suspendable polymer.

The content of the water-suspendable polymer in the heat seal layer is preferably 20% by mass or more, and more preferably 30% by mass or more from the viewpoint of heat sealability. The upper limit of the content of the water-suspendable polymer in the heat seal layer is not particularly limited, and is preferably 100% by mass or less, and more preferably 90% by mass or less.

The water-suspendable polymer contained in the heat seal layer is not particularly limited insofar as substances have heat sealability, and is more preferably one or more selected from styrene-butadiene copolymers; olefin-unsaturated carboxylic acid copolymers, such as ethylene-acrylic acid copolymers and ethylene-methacrylic acid copolymers: biodegradable resins; polyolefin resins, such as polyethylene and polypropylene; and acrylic resins, such as acrylic acid methyl copolymers, methyl methacrylate copolymers, styrene-acrylic copolymers, and styrene-methacrylic copolymers.

Among the above, one or more selected from styrene-butadiene copolymers and olefin-unsaturated carboxylic acid copolymers are more preferable. In this specification, acrylic resins do not include the olefin-unsaturated carboxylic acid copolymers.

The olefin-unsaturated carboxylic acid copolymers may be salts in which carboxyl groups derived from unsaturated carboxylic acid monomers are partially or completely neutralized with alkali metal hydroxide, ammonia, alkylamine, alkanolamine, and the like.

Examples of olefin monomers of the olefin-unsaturated carboxylic acid copolymers include ethylene, propylene, butadiene, and the like. These substances may be used alone or in combination of two or more kinds thereof. In particular, ethylene is preferable.

Examples of the unsaturated carboxylic acid monomers of the olefin-unsaturated carboxylic acid copolymers include unsaturated carboxylic acids, such as acrylic acid, methacrylic acid, crotonic acid, cinnamic acid, itaconic acid, fumaric acid, maleic acid, and butanetricarboxylic acid; unsaturated polycarboxylic acid alkyl esters having at least one carboxyl group, such as itaconic acid monoethyl ester, fumaric acid monobutyl ester, and maleic acid monobutyl ester; unsaturated sulfonic acid monomers, such as acrylamide propanesulfonic acid, acrylic acid sulfoethyl sodium salt, and methacrylic acid sulfopropyl sodium salt, or salts thereof; and the like. These substances may be used alone or in combination of two or more kinds thereof. Among the above, unsaturated carboxylic acids are preferable, acrylic acids and methacrylic acids are more preferable, and acrylic acids are particularly preferable.

Therefore, the olefin-unsaturated carboxylic acid copolymer is preferably at least one of ethylene-acrylic acid copolymers and ethylene-methacrylic acid copolymers.

Ethylene-unsaturated carboxylic acid copolymers are preferably obtained by emulsion polymerization of ethylene and the unsaturated carboxylic acid monomers. The ethylene-unsaturated carboxylic acid copolymers are preferably ethylene-acrylic acid copolymers and ethylene-methacrylic acid copolymers. The copolymers may be copolymerized with monomers containing other compounds copolymerizable with ethylene and the unsaturated carboxylic acid monomers insofar as the effects of the invention are not impaired.

Specific examples of the ethylene-unsaturated carboxylic acid copolymers include ZAIKTHENE (registered trademark) AC (aqueous dispersion liquid of ethylene-acrylic acid copolymer ammonium salt, melting point: 95° C., copolymerization ratio of acrylic acid of 20% by mole manufactured by Sumitomo Seika Chemicals Company, Limited.), MFHS 1279 (mixture with carnauba wax manufactured by MICHELMAN), and the like.

The biodegradable resins are preferably one or more selected from polylactic acids (PLA), polybutylene succinate (PBS), polybutylene succinate adipate (PBSA), polybutylene adipate terephthalate (PBAT), and poly(3-hydroxybutyrate-co-hydroxyhexanoate) (PHBH), more preferably one or more selected from polylactic acids and polybutylene succinate, and particularly preferably polylactic acids. Packaging materials and the like using paper substrates have an advantage of reducing environmental loads as compared with packaging materials and the like containing resin films. The use of the biodegradable resins as the heat seal layer can further reduce the environmental loads.

As polylactic acids, any of commercially available products and synthetic products may be used. Examples of commercially available products include LANDY PL-1000 and LANDY PL-3000 (aqueous dispersion liquid of polylactic acids manufactured by MIYOSHI OIL & FAT CO., LTD.) and the like.

The heat seal layer preferably contains at least one of lubricants and pigments in addition to the water-suspendable polymer from the viewpoint of suppressing blocking of the heat seal paper.

(Lubricant)

The lubricants are substances capable of reducing the friction coefficient of the surface of the heat seal layer by being compounded in the heat seal layer. Due to the fact that the heat seal layer contains the lubricants, the slipperiness of the heat seal paper is improved.

The lubricants are not particularly limited, and, for example, waxes, metallic soaps, fatty acid esters, and the like are usable. The lubricants may be used alone or in combination of two or more kinds thereof. Examples of the waxes include natural waxes, such as waxes derived from animals or plants (for example, beeswax, carnauba wax, and the like), mineral waxes (e.g., microcrystalline wax), and petroleum waxes; synthetic waxes, such as polyethylene waxes, paraffin waxes, and polyester waxes, and the like. Examples of the metallic soaps include, for example, calcium stearate, sodium stearate, zinc stearate, aluminum stearate, magnesium stearate, fatty acid sodium soap, oleic acid potassium soap, castor oil potassium soap, complexes thereof, and the like. Among the lubricants above, polyethylene waxes are preferable because the melting point is high, the coating layer becomes less likely to be softened even in a relatively high temperature environment, and the blocking suppressing effect is excellent. Further, carnauba wax and paraffin waxes are also preferable because the melting point is relatively low, wax components are easily formed on the surface of the coating layer, and the blocking suppressing effect is excellent. As polyethylene waxes, any of synthetic products and commercially available products may be used, and examples of commercially available products include CHEMIPEARL W-310 manufactured by Mitsui Chemicals, Inc., and the like. As the carnauba wax, any of synthetic products and commercially available products may be used. Examples of commercially available products include Selosol 524 manufactured by Chukyo Yushi Co., Ltd., MFHS 1279 (mixture with ethylene-acrylic acid copolymers) manufactured by MICHELMAN, and the like. As paraffin waxes, any of synthetic products and commercially available products may be used. Examples of commercially available products include Hidorin L-700 manufactured by Chukyo Yushi Co., Ltd. and the like.

When the heat seal layer contains the lubricants, the content of the lubricants is preferably 0.5 parts by mass or more, and more preferably 1 part by mass or more, and is preferably 50 parts by mass or less, and more preferably 40 parts by mass or less based on 100 parts by mass of the water-suspendable polymer.

When the heat seal layer contains the lubricants, the content of the lubricants in the heat seal layer is preferably 0.2% by mass or more, and more preferably 0.5% by mass or more, and is preferably 30% by mass or less, and more preferably 20% by mass or less.

(Pigment)

The pigments are not particularly limited, and various pigments used in pigment coating layers of conventional coated papers are mentioned as examples. Specific examples include kaolin, various kinds of kaolin, such as calcined kaolin, structured kaolin, and delaminated kaolin, talc, heavy calcium carbonate (crushed calcium carbonate), light calcium carbonate (synthetic calcium carbonate), composite synthetic pigments of calcium carbonate and other hydrophilic organic compounds, satin white, lithopone, titanium dioxide, silica, barium sulfate, calcium sulfate, alumina, aluminum hydroxide, zinc oxide, magnesium carbonate, silicate, colloidal silica, plastic pigments of hollow or solid organic pigments, binder pigments, plastic beads, microcapsules, and the like. Among the above, kaolin is preferable because of its excellent blocking suppressing effect. The pigments may be used alone or in combination of two or more kinds thereof.

The mean particle size of the pigments is not particularly limited, and is preferably 0.1 μm or more, more preferably 0.3 μm or more, and still more preferably 0.5 μm or more, and is preferably 30 μm or less, more preferably 20 μm or less, and still more preferably 10 μm or less from the viewpoint of blocking resistance and heat sealability. As the mean particle size of the pigments, a value measured by a laser diffraction/scattering particle size distribution measuring apparatus is adopted.

When the heat seal layer contains the pigments, the content of the pigments is preferably 10 parts by mass or more, more preferably 20 parts by mass or more, and still more preferably 30 parts by mass or more, and is preferably 100 parts by mass or less, more preferably 80 parts by mass or less, and still more preferably 60 parts by mass or less based on 100 parts by mass of the water-suspendable polymer.

When the heat seal layer contains the pigments, the content of the pigments in the heat seal layer is preferably 5% by mass or more, more preferably 10% by mass or more, and still more preferably 20% by mass or more, and is preferably 50% by mass or less, more preferably 40% by mass or less, and still more preferably 35% by mass or less.

The heat seal layer may include optional components in addition to the water-suspendable polymer and, as necessary, the lubricants or/and the pigments. Examples of the optional components include dispersants, surfactants, antioxidants, antistatic agent, dyes, plasticizers, and the like.

The thickness of the heat seal layer is preferably 1 μm or more and more preferably 2 μm or more from the viewpoint of heat sealability, and is preferably 15 μm or less, more preferably 10 μm or less, and still more preferably 7 μm or less from the viewpoint of recyclability.

When the vapor deposition paper has the vapor deposition layer on each surface, the vapor deposition paper may have the heat seal layer on one surface or each surface. Among the above, the vapor deposition paper preferably has the heat seal layer on one surface. Due to the fact that the heat seal layer is provided on one surface, the production efficiency is excellent, and, when the vapor deposition paper is heat-sealed, bag-like articles and the like can be easily produced.

<Method for Producing Vapor Deposition Paper>

A method for producing the vapor deposition paper is not particularly limited, and known methods can be adopted. In one aspect, the vapor deposition paper can be obtained by laminating the clay coat layer, the undercoat layer, the vapor deposition layer, the overcoat layer, and the heat seal layer in this order on at least one surface of the paper substrate. In this case, the undercoat layer, the overcoat layer, and the heat seal layer are preferably formed using the aqueous medium. Thus, the vapor deposition paper having barrier properties and heat sealability as well as excellent recyclability is obtained.

Preferable aspects of the method for forming each layer and the components used to form each layer are as described above. A coating method for each layer is not particularly limited, and examples thereof include a bar coating method, a blade coating method, a squeeze coating method, an air knife coating method, a roll coating method, a gravure coating method, a transfer coating method, and the like, and coating machines, such as a fountain coater and a slit die coater, are usable. The concentration of a coating liquid for each layer can be adjusted as appropriate. Drying conditions after coating are also not particularly limited, and, for example, drying is performed at 80 to 160° C. for 10 seconds to 30 minutes.

<Physical Properties of Vapor Deposition Paper>

[Thickness]

The thickness of the vapor deposition paper according to each of the first embodiment and the second embodiment is preferably 10 μm or more, more preferably 20 μm or more, still more preferably 30 μm or more, and still more preferably 50 μm or more, and is preferably 200 μm or less, more preferably 150 μm or less, still more preferably 100 μm or less, and still more preferably 80 μm or less.

[Oxygen Permeability]

As for the vapor deposition paper of each of the first embodiment and the second embodiment, when a laminated sheet is formed by laminating a 20 μm thick unstretched polypropylene film (CPP film) on the overcoat layer of the vapor deposition paper (on the heat seal layer when the heat seal layer is provided on the overcoat layer), the oxygen permeability of the laminated sheet at a temperature of 23° C. and a relative humidity 50% measured according to JIS K 7126-2:2006 is 2.0 mL/m²·day·atm or less, preferably 1.0 mL/m²·day·atm or less, and more preferably 0.5 mL/m²·day·atm or less. The lower limit is not particularly limited, and is preferably 0 mL/m²·day·atm or more and 0.05 mL/m²·day·atm or more. For the lamination of the vapor deposition paper and the CPP film, an adhesive is used, for example. The type and the coating amount of the adhesive are not particularly limited insofar as the adhesive does not have gas barrier properties, and are as described in Examples, for example. The oxygen permeability can be reduced by, for example, setting the thickness of the undercoat layer to the optimal thickness described above, improving the smoothness of the undercoat layer, and increasing the thickness of the vapor deposition layer. Herein, the "adhesive does not have gas barrier properties" means that a laminated sheet obtained by applying 4 g/m² of the target adhesive to a paper substrate having an Oken air resistance measured according to JIS P 8117:2009 of 100 seconds or less, and laminating a 20 μm thick CPP film has an oxygen permeability at a temperature 23° C. and a relative humidity of 50% (may be indicated as 50% RH) measured according to JIS K 7126-2:2006 of 2000 mL/m²·day·atm or more.

[Water Vapor Permeability]

The water vapor permeability of the vapor deposition paper of each of the first embodiment and the second embodiment is preferably 1.0 g/(m²·day) or less and more preferably 0.7 g/(m²·day) or less at 40° C. and 90% RH. The lower limit is not particularly limited, and is preferably 0 g/(m²·day) or more, 0.1 g/(m²·day) or more, and 0.2 g/(m$^2$·day) or more. The water vapor permeability of the vapor deposition paper is measured according to JIS Z 0208:1976 (cup method), B method. The water vapor permeability can be reduced by, for example, setting the thickness of the undercoat layer to the optimal thickness described above, improving the smoothness of the undercoat layer, and increasing the thickness of the vapor deposition layer.

[Peel Strength]

In the vapor deposition paper of each of the first embodiment and the second embodiment, the peel strength of the heat seal layer is preferably 2 N/15 mm or more and more preferably 3 N/15 mm or more, and, the upper limit is not particularly limited, and is preferably 10 N/15 mm or less. The peel strength of the heat seal layer is peel strength when the heat seal layers are heat-sealed under the conditions of 150° C., 0.2 MPa, and 1 second, and specifically, a value measured by a method described in Examples described below is adopted.

[Pulp Recovery Rate after Re-Disintegration]

In the vapor deposition paper of each of the first embodiment and the second embodiment, the pulp recovery rate after re-disintegration is 80% or more, preferably 85% or more, and more preferably 90% or more (upper limit: 100% or less). When the pulp recovery rate after re-disintegration falls within the ranges above, the recovered pulp can be effectively reused, and thus the recyclability is excellent. The pulp recovery rate after re-disintegration is measured by a method described in Examples described below.

[Cobb Water Absorption Degree]

In the vapor deposition paper according to each of the first embodiment and the second embodiment, the Cobb water absorption degree of the surface on the side of the overcoat layer (e.g., surface of the overcoat layer or the surface of the heat seal layer when the heat seal layer is provided on the overcoat layer) at a temperature of 23° C. for a contact time of 120 seconds measured according to JIS P 8140:1998 is 1.0 g/m$^2$ or less and preferably 0.5 g/m$^2$ or less. It is considered that, by setting the Cobb water absorption degree of the surface on the side of the overcoat layer within the ranges above, a water-impermeable film with few defects can be formed, and therefore the obtained vapor deposition paper can exhibit excellent barrier properties. The lower limit of the Cobb water absorption degree of the surface on the side of the overcoat layer is not particularly limited, and is, for example, 0 g/m$^2$ or more, 0.1 g/m$^2$ or more, and 0.2 g/m$^2$ or more. The Cobb water absorption degree of the surface on the side of the overcoat layer can be adjusted within the ranges above by adjusting the components and the coating amounts of the coating layer (e.g., undercoat layer) and the overcoat layer.

In the vapor deposition paper according to each of the first embodiment and the second embodiment, the Cobb water absorption degree of the surface (e.g., surface of the paper substrate) on the side opposite to the side of the overcoat layer at a temperature of 23° C. for a contact time of 120 seconds measured according to JIS P 8140:1998 is 10 g/m$^2$ or more and preferably 20 g/m$^2$ or more. It is considered that, by setting the Cobb water absorption degree of the surface on the side opposite to the side of the overcoat layer within the ranges above, the permeation of water into the paper substrate is facilitated, which allows the obtained vapor deposition paper to exhibit excellent recyclability. The upper limit of the Cobb water absorption degree of the surface on the side opposite to the side of the overcoat layer is not particularly limited, and is preferably 40 g/m$^2$ or less and more preferably 30 g/m$^2$ or less. The Cobb water absorption degree of the surface on the side opposite to the side of the overcoat layer can be adjusted within the ranges above by selecting the paper substrate, for example.

[Surface Specific Electrical Resistance]

In the vapor deposition paper according to the second embodiment, the surface specific electrical resistance of the surface on the side of the overcoat layer measured according to JIS C 2139:2008 is $1.0\times10^{12}\Omega$ or more, more preferably $2.0\times10^{12}\Omega$ or more, still more preferably $1.0\times10^{13}\Omega$ or more, and yet still more preferably $2.0\times10^{14}\Omega$ or more. By setting the surface specific electrical resistance of the surface on the side of the overcoat layer of the vapor deposition paper within the ranges above, the contamination of metal foreign matter is suppressed and the recyclability is improved. The upper limit of the surface specific electrical resistance of the surface on the side of the overcoat layer is not particularly limited, and is $1.0\times10^{15}\Omega$ or less, for example. The surface specific electrical resistance can be adjusted within the ranges above by adjusting the coating amounts of the coating layer (e.g., undercoat layer) and the overcoat layer, the components of the coating layer (e.g., resin of the undercoat layer) and the overcoat layer, selecting the vapor deposition layer, and the like.

<Application of Vapor Deposition Paper>

The vapor deposition paper of each of the first embodiment and the second embodiment can be suitably used as packaging materials for food, such as coffee, confectionery, and milk, pharmaceuticals, medical products, electronic parts, and the like utilizing the barrier properties and the heat sealability.

EXAMPLES

Hereinafter, the characteristics of the present invention are more specifically described with reference to Examples and Comparative Examples below. The materials, used amounts, proportions, treatment details, treatment procedures, and the like described in Examples below can be changed as appropriate without departing from the gist of the present invention. Accordingly, the scope of the present invention should not be limitedly interpreted by specific examples described below. Unless otherwise specified, the following operations were performed under the conditions of 23° C. and a relative humidity of 50% RH. "Part(s)" and "%" in Examples and Comparative Examples indicate "part(s) by mass" and "% by mass", respectively, unless otherwise specified.

Production of Vapor Deposition Paper According to
Example A

Example A1

80 parts by mass (solid content) of Kaolin (Contour Xtreme manufactured by IMERYS, aspect ratio: 33, mean particle size: 0.26 μm) dispersed in water such that the solid content was 40% as an inorganic pigment and 20 parts by mass (solid content) of an aqueous emulsion of styrene-acrylic resin (JONCRYL HSL-9012 manufactured by BASF, glass transition temperature: 5° C.) as a binder were mixed to prepare a coating liquid for clay coat layer having a solid content concentration of 40% by mass. The coating liquid for clay coat layer above was applied using a Meyer bar to the glossy surface of one side glossy paper (manufactured by Oji F-Tex Co., Ltd., hardwood pulp compounding ratio: 100% by mass, disintegration freeness: 420 ml, basis weight: 50 g/m$^2$, thickness: 60 μm, density: 0.83 g/cm$^3$, sizing degree: 9 seconds, Oken smoothness of glossy surface: 499 seconds, Oken smoothness of non-glossy surface: 15 seconds), followed by drying at 120°° C. for 1 minute, to form a clay coat layer (coating amount: 12 g/m² thickness: 4.6 μm).

Next, onto the clay coat layer, a polyurethane resin dispersion (Takelac WPB-341 manufactured by Mitsui Chemicals, Inc., oxygen permeability at 23° C. and 50% RH when the polyurethane resin was molded into a 25 μm thick sheet: 2.0 mL/(m²·day·atm), glass transition temperature: 130° C.) was applied using a Meyer bar, followed by drying at 120° C. for 1 minute, to form an undercoat layer (coating amount: 2 g/m², thickness: 2 μm). When the polyurethane resin was subjected to the 1H-NMR measurement, the content of a constituent unit derived from metaxylylene diisocyanate based on the total amount of a constituent unit derived from polyisocyanate was 50% by mole or more.

Next, onto the vapor deposition layer, an aluminum vapor deposition layer (thickness: 50 nm) was formed by vacuum deposition on the undercoat layer, and, further, a polyurethane resin dispersion (Takelac WPB-341 manufactured by Mitsui Chemicals, Inc., oxygen permeability at 23° C. and 50% RH when the polyurethane resin is molded into a 25 μm thick sheet: 2.0 mL/(m²·day·atm), glass transition temperature: 130° C.) was applied using a Meyer bar, followed by drying at 120° C. for 1 minute, to form an overcoat layer (coating amount: 0.5 g/m², thickness: 0.5 μm).

Next, a heat seal agent (MFHS1279 manufactured by MICHELMAN) containing an ethylene-acrylic acid copolymer and carnauba wax was applied onto the overcoat layer using a Meyer bar, followed by drying at 120° C. for 1 minute, to form a heat seal layer (coating amount: 3 g/m², thickness: 3 μm), so that a 70 μm thick vapor deposition paper was obtained.

Example A2

A 64 μm thick vapor deposition paper was obtained in the same manner as in Example A1, except for changing the paper substrate to one side glossy paper (manufactured by Oji F-Tex Co., Ltd., hardwood pulp compounding ratio: 100% by mass, disintegration freeness: 420 ml, basis weight: 40 g/m² thickness: 54 μm, density: 0.76 g/cm³ sizing degree: 3 seconds, Oken smoothness of glossy surface: 466 seconds, Oken smoothness of non-glossy surface: 13 seconds).

Example A3

A 71 μm thick vapor deposition paper was obtained in the same manner as in Example A1, except for preparing a coating liquid for clay coat layer having a solid content concentration of 40% by mass by mixing 70 parts by mass (solid content) of Kaolin (CENTURY HC manufactured by IMERYS, aspect ratio: 20, mean particle size: 2.0 μm) dispersed in water such that the solid concentration was 40% as an inorganic pigment and 30 parts by mass (solid content) of an aqueous emulsion of styrene-acrylic resin (ACRONAL S504 manufactured by BASF, glass transition temperature: 5° C.) as a binder.

Example A4

A 71 μm thick vapor deposition paper was obtained in the same manner as in Example A1, except for mixing 30 parts by mass (solid content) of Kaolin (CENTURY HC manufactured by IMERYS, aspect ratio: 20, mean particle size:

2.0 μm) dispersed in water such that the solid content concentration was 40% and 70 parts by mass (solid content) an aqueous emulsion of styrene-butadiene copolymer (Styronal S316 manufactured by BASF) and forming a coating for heat seal layer having a solid content concentration of 40% by mass.

Comparative Example A1

A 70 μm thick vapor deposition paper was obtained in the same manner as in Example A1, except for using a solution of acrylic resin dissolved in ethyl acetate (Almic W manufactured by Dainichiseika Color & Chemicals Mfg. Co., Ltd.) having a solid content concentration of 30% by mass as a coating for heat seal layer.

Comparative Example A2

A 70 μm thick vapor deposition paper was obtained in the same manner as in Example A1, except for using a solution of polyester resin dissolved in ethyl acetate (UE9800 manufactured by Unitika Ltd.) having a solid content concentration of 30% by mass as a coating for overcoat layer.

Comparative Example A3

A 72 μm thick vapor deposition paper was obtained in the same manner as in Example A1, except for mixing 67 parts by mass of kaolin (BARRISURF HX manufactured by IMERYS, aspect ratio: 100, mean particle size: 9.0 μm) as an inorganic pigment and 33 parts by mass of an ethylene-acrylic acid copolymer (ZAIKTHENE AC manufactured by Sumitomo Seika Chemicals Company, Limited.) as a binder and forming a coating for clay coat layer having a solid content concentration of 40% by mass.

<Evaluation of Vapor Deposition Paper>
[Oxygen Permeability]

The oxygen permeability of each vapor deposition paper was measured under the conditions of a temperature of 23° C. and a relative humidity of 50% using an oxygen permeability meter (OX-TRAN2/22 manufactured by MOCON, Inc.). Specifically, 5 g/m² of an isocyanate adhesive (manufactured by DIC Corporation, 1 part of DICDRY KW-75 was mixed with 10 parts of DICDRY LX-500) was applied onto the heat seal layer of the vapor deposition paper obtained in each of Examples and Comparative Examples, and then a 20 μm thick CPP film (GP-32 manufactured by Hokuetsu Kasei Com.) was laminated to form a laminated sheet. The laminated sheet was measured for an oxygen permeability at a temperature of 23° C. and a relative humidity of 50% according to JIS K 7126-2:2006. The lower the value of the oxygen permeability, the more excellent the oxygen barrier properties.

As an evaluation of processing resistance, the oxygen permeability after folding was also measured. According to a folding method, the vapor deposition paper was folded (fold angle of 180°) once and opened, the vapor deposition paper was folded again (fold angle of 180°) along a line perpendicular to the folding line and opened, and then the intersection of the folding lines was placed in the center of a measuring unit of the oxygen permeability meter, thereby measuring the oxygen permeability.

[Water Vapor Permeability]

The water vapor permeability was measured by arranging each vapor deposition paper such that the heat seal layer was located inside (low humidity side) according to JIS Z 0208:1976 (cup method), B method (temperature: 40°

C.±0.5° C., relative humidity: 90%±2%). The lower the value of the water vapor permeability, the more excellent the water vapor barrier properties.

Further, as an evaluation of processing resistance, the water vapor permeability after folding was also measured. According to a folding method, the vapor deposition paper was folded (fold angle of 180°) once and opened, the vapor deposition paper was folded again (fold angle of) 180°) along a line perpendicular to the folding line and opened, and then the intersection of the folding lines was placed in the center of a measuring unit of the oxygen permeability meter, thereby measuring the water vapor permeability.

[Heat Sealability (Peel Strength)]

A set of two sheets of vapor deposition paper was overlaid on one another such that the heat seal layers faced each other, and heat-sealed under the conditions of 150° C., 0.2 MPa, and 1 second using a heat seal tester (TP-701-B manufactured by TESTER SANGYO CO., LTD.). The heat-sealed test piece was allowed to still stand for 4 hours or more in a room having a temperature of 23° C.±1° C. and a relative humidity of 50%+2%. Subsequently, the heat-sealed test piece was cut to a width of 15 mm and T-peeled using a tensile tester at a tensile speed of 300 mm/min, and then the recorded maximum load was set as heat seal peel strength.

[Recyclability (Pulp Recovery Rate after Re-Disintegration)]

The vapor deposition paper having an absolute dry mass of 30 g was torn by hands to 3 to 4 cm squares and immersed in 20° C. tap water overnight. The resultant vapor deposition paper was diluted with tap water such that the concentration of the vapor deposition paper was 2.5%, and then subjected to disintegration treatment for 10 minutes at a rotation speed of 3000 rpm using a TAPPI standard disintegrator (manufactured by KUMAGAI RIKI KOGYO Co., Ltd.). The obtained pulp slurry was subjected to a flat screen (manufactured by KUMAGAI RIKI KOGYO Co., Ltd.) set with a 6-cut screen plate (slit width: 0.15 mm), and subjected to screening treatment in an 8.3 L/min water flow. Non-disintegrated substances remaining on the screen plate were recovered and dried in a 105° C. oven, thereby measuring the absolute dry mass, and the pulp recovery rate was calculated from Equation below.

Pulp recovery rate (%)={Absolute dry mass (g) of vapor deposition paper subjected to test−Absolute dry mass (g) of non-disintegrated substance}/Absolute dry mass of vapor deposition paper subjected to test×100

[Cobb Water Absorption Degree]

A test was performed according to JIS P 8140:1998. The temperature of water (distilled water was used) to be brought into contact with the vapor deposition paper was set to 23° C. and the contact time was set to 120 seconds. Then, the water was brought into contact with the surface on the side of the heat seal layer of the vapor deposition paper and the surface on the opposite side (i.e., surface of the paper substrate).

TABLE 1

|  |  |  | Ex. A1 | Ex. A2 | Ex. A3 | Ex. A4 |
|---|---|---|---|---|---|---|
| Paper substrate | Basis weight (g/m²) | | 50 | 40 | 50 | 50 |
| | Thickness (μm) | | 60 | 54 | 60 | 60 |
| | Density (g/cm³) | | 0.83 | 0.76 | 0.83 | 0.83 |
| | Sizing degree(s) | | 9 | 3 | 9 | 9 |
| Clay coat layer | Clay content (%) by mass | | 80 | 80 | 70 | 80 |
| | Resin type | | Styrene-acryl | Styrene-acryl | Styrene-acryl | Styrene-acryl |
| | Coating liquid | | Water base | Water base | Water base | Water base |
| Undercoat layer | Resin type | | Polyurethane | Polyurethane | Polyurethane | Polyurethane |
| | Coating liquid | | Water base | Water base | Water base | Water base |
| Vapor deposition layer | Type | | Aluminum | Aluminum | Aluminum | Aluminum |
| | Thickness (nm) | | 50 | 50 | 50 | 50 |
| Overcoat layer | Resin type | | Polyurethane | Polyurethane | Polyurethane | Polyurethane |
| | Coating liquid | | Water base | Water base | Water base | Water base |
| Heat seal layer | Resin type | | Ethylene-acrylic acid | Ethylene-acrylic acid | Ethylene-acrylic acid | Styrene-butadiene |
| | Lubricant | | Carnauba wax | Carnauba wax | Carnauba wax | — |
| | Pigment | | — | — | — | Kaolin |
| | Coating liquid | | Water base | Water base | Water base | Water base |
| Vapor deposition paper | Oxygen permeability Ml/m² · day · atm) | Before folding | 0.2 | 0.2 | 0.2 | 0.2 |
| | Coating liquid | After folding | 0.3 | 0.6 | 0.4 | 0.3 |
| | Water vapor permeability (g/(m² · day)) | Before folding | 0.2 | 0.2 | 0.2 | 0.2 |
| | | After folding | 0.2 | 0.2 | 0.3 | 0.2 |
| | Cobb water absorption degree (Surface on side of heat seal layer) (g/m²) | | 0.1 | 0.1 | 0.1 | 0.1 |
| | Cobb water absorption degree (Surface on side opposite to side of heat seal layer (g/m²) | | 25.4 | 25.4 | 25.4 | 25.4 |
| | Heat seal peel strength (N/15 mm) | | 3.5 | 3.5 | 3.5 | 3.5 |
| | Pulp recovery rate after re-disintegration (%) | | 91 | 86 | 88 | 93 |

|  |  |  | Comp. Ex. A1 | Comp. Ex. A2 | Comp. Ex. A3 |
|---|---|---|---|---|---|
| Paper substrate | Basis weight (g/m²) | | 50 | 50 | 50 |
| | Thickness (μm) | | 60 | 60 | 60 |
| | Density (g/cm³) | | 0.83 | 0.83 | 0.83 |
| | Sizing degree(s) | | 9 | 9 | 9 |

TABLE 1-continued

| | | Ex. A1 | Ex. A2 | Ex. A3 | Ex. A4 |
|---|---|---|---|---|---|
| Clay coat layer | Clay content (%) by mass | 80 | 80 | | 67 |
| | Resin type | Styrene-acryl | Styrene-acryl | | |
| | Coating liquid | Water base | | | Water base |
| Undercoat layer | Resin type | | Polyurethane | | Polyurethane |
| | Coating liquid | | Water base | | Water base |
| Vapor deposition layer | Type | Aluminum | Aluminum | | Aluminum |
| | Thickness (nm) | 50 | 50 | | 50 |
| Overcoat layer | Resin type | Polyurethane | Polyurethane | | Polyurethane |
| | Coating liquid | Water base | | | Water base |
| Heat seal layer | Resin type | Acrylic resin | Ethylene-acrylic acid | | Ethylene-acrylic acid |
| | Lubricant | Carnauba wax | Carnauba wax | | Carnauba wax |
| | Pigment | — | — | | — |
| | Coating liquid | Water base | Water base | | Water base |
| Vapor deposition paper | Oxygen permeability Ml/$m^2 \cdot$ day $\cdot$ atm) — Before folding | 0.5 | 0.3 | | 0.2 |
| | Coating liquid — After folding | 0.7 | 0.8 | | 0.3 |
| | Water vapor permeability (g/($m^2 \cdot$ day)) — Before folding | 0.9 | 0.3 | | 0.2 |
| | After folding | 1.1 | 0.9 | | 0.2 |
| | Cobb water absorption degree (Surface on side of heat seal layer) (g/$m^2$) | 0.1 | 0.1 | | 0.1 |
| | Cobb water absorption degree (Surface on side opposite to side of heat seal layer (g/$m^2$) | 25.4 | 25.4 | | 25.4 |
| | Heat seal peel strength (N/15 mm) | 3.5 | 3.5 | | 3.5 |
| | Pulp recovery rate after re-disintegration (%) | 65 | 75 | | 71 |

Table 1 showed that the vapor deposition paper of each of Examples A1 to A4 all had excellent oxygen permeability, water vapor permeability, and heat seal peel strength and high pulp recovery rate after re-disintegration. On the other hand, the vapor deposition paper of each of Comparative Examples A1 to A3 all had a low pulp recovery rate after re-disintegration and poor recyclability. The results above showed that the vapor deposition paper of the first embodiment has barrier properties and heat sealability and excellent recyclability.

Production of Vapor Deposition Paper According to Example B

Example B1

80 parts by mass of Kaolin (Contour Xtreme manufactured by IMERYS, aspect ratio: 33, mean particle size d50:0.26 μm) and 20 parts by mass (solid content) of a styrene-acrylic copolymer binder (JONCRYL HSL-9012 manufactured by BASF) were mixed to prepare a coating liquid for clay coat layer. The coating liquid for clay coat layer above was applied using a Meyer bar to the glossy surface of one side glossy paper (manufactured by Oji F-Tex Co., Ltd., hardwood pulp compounding ratio: 100% by mass, disintegration freeness: 420 ml, basis weight: 50 g/$m^2$, thickness: 60 μm, density: 0.83 g/$cm^3$, sizing degree: 9 seconds, Oken smoothness of glossy surface: 499 seconds, Oken smoothness of non-glossy surface: 15 seconds), followed by drying at 120° C. for 1 minute to form a clay coat layer (12 g/$m^2$).

Next, onto the clay coat layer, a coating liquid for undercoat layer prepared by mixing 0.15 parts by mass of aminopropyltriethoxysilane (KBE-903 manufactured by Shin-Etsu Chemical Co., Ltd.) with 100 parts by mass of an aqueous dispersion liquid of a polyurethane resin binder (Takelac WPB-341 manufactured by Mitsui Chemicals, Inc.: glass transition temperature: 130° C., solid content concentration: 30%) having an oxygen permeability (23° C., 50% RH) when the polyurethane resin was molded into a 25 μm thick sheet of 2.0 mL/($m^2 \cdot$day·atm) was applied using a Meyer bar, followed by drying at 120° C. for 1 minute, to form an undercoat layer (2 g/$m^2$), thereby obtaining a base paper for vapor deposition paper.

On the undercoat layer of the obtained base paper for vapor deposition paper, a silicon oxide vapor deposition layer (thickness: 100 Å (10 nm)) was formed by vacuum deposition. Onto the silicon oxide vapor deposition layer, an aqueous dispersion liquid of a polyurethane resin binder (Takelac WPB-341 manufactured by Mitsui Chemicals, Inc.) having an oxygen permeability (23° C., 50% RH) when the polyurethane resin was molded into a 25 μm thick sheet of 2.0 mL/($m^2 \cdot$day·atm) was applied using a Meyer bar, followed by drying at 120° C. for 1 minute, to form an overcoat layer (0.5 g/$m^2$, thickness: 0.5 μm), so that a 68 μm thick vapor deposition paper was obtained.

When the polyurethane resin used for the undercoat layer and the overcoat layer was subjected to the 1H-NMR measurement, the content of a constituent unit derived from metaxylylene diisocyanate based on the total amount of a constituent unit derived from polyisocyanate was 85% by mole, which was 50% by mole or more. The solubility in water at 25° C. of the polyurethane resin binder was 10 g/L or less.

Example B2

A 67 μm vapor deposition paper was obtained in the same manner as in Example B1, except for setting the coating amount of the undercoat layer to 1 g/$m^2$.

Example B3

A 68 μm thick vapor deposition paper was obtained in the same manner as in Example B1, except for forming an undercoat layer Ω g/$m^2$) using a polylactic acid emulsion (Randy PL-3000 manufactured by MIYOSHI OIL & FAT CO., LTD., solid content concentration: 40%). The solubility in 25° C. water of the polylactic acid was 10 g/L or less.

Example B4

A 68 μm thick vapor deposition paper was obtained in the same manner as in Example B1, except for forming an undercoat layer Ω g/m$^2$) and an overcoat layer (0.5 g/m$^2$, thickness: 0.5 μm) using an aqueous dispersion liquid of a polyurethane resin binder having a hydroxy group (HPU W-003 manufactured by Dainichiseika Color & Chemicals Mfg. Co., Ltd., hydroxy value 235 mg KOH/g, solid content concentration: 30%). The solubility in 25° C. water of the polyurethane resin binder having a hydroxy group was 10 g/L or less.

Example B5

A 68 μm thick vapor deposition paper was obtained in the same manner as in Example B1, except for forming a vapor deposition layer (thickness: 10 nm) using aluminum oxide instead of silicon oxide by vacuum deposition.

Example B6

A vapor deposition paper was obtained in the same manner as in Example B1, except for forming a vapor deposition layer (thickness: 10 nm) using silicon oxide and aluminum oxide at the same time (mass ratio, silicon oxide: aluminum oxide=50:50) instead of silicon oxide by vacuum deposition.

Comparative Example B1

A 68 μm vapor deposition paper was obtained in the same manner as in Example 1, except for changing the vapor deposition layer to an aluminum vapor deposition layer (thickness: 500 Å (50 nm)).

Comparative Example B2

A 68 μm thick vapor deposition paper was obtained in the same manner as in Example B1, except for forming an undercoat layer Ω g/m$^2$) using an aqueous dispersion liquid of an ethylene-acrylic acid copolymer binder (ZAIKTHENE AC manufactured by Sumitomo Seika Chemicals Company, Limited., solid content concentration: 29%).

Comparative Example B3

A 75 μm thick vapor deposition paper was obtained in the same manner as in Example B1, except for applying a clay coat layer and an undercoat layer to each surface of a paper substrate, and forming a vapor deposition layer and an overcoat layer only on one of the undercoat layers.
<Evaluation of Vapor Deposition Paper>
The vapor deposition paper obtained in each of Examples B1 to B6 and Comparative Examples B1 to B3 was evaluated as follows.
[Cobb Water Absorption Degree]
A test was performed according to JIS P 8140:1998. The temperature of water (distilled water was used) to be brought into contact with the vapor deposition paper was set to 23° C. and the contact time was set to 120 seconds. Then, the water was brought into contact with the surface on the side of the overcoat layer of the vapor deposition paper and the surface on the opposite side (i.e., surface of the paper substrate).
[Surface Specific Electrical Resistance]
The surface specific electrical resistance of the surface on the side of the overcoat layer (surface of the overcoat layer) was measured according to JIS C 2139:2008.
<Evaluation of Vapor Deposition Paper>
[Oxygen Permeability]
The oxygen permeability of each vapor deposition paper was measured under the conditions of a temperature of 23° C. and a relative humidity of 50% using an oxygen permeability meter (OX-TRAN2/22 manufactured by MOCON, Inc.).
Specifically, 5 g/m$^2$ of an isocyanate adhesive (manufactured by DIC Corporation, 1 part of DICDRY KW-75 was mixed with 10 parts of DICDRY LX-500) was applied onto the overcoat layer of the vapor deposition paper obtained in each of Examples B1 to B6 and Comparative Examples B1 to B3, and then a 20 μm thick CPP film (GP-32 manufactured by Hokuetsu Kasei Com.) was laminated to form a laminated sheet. The laminated sheet was measured for an oxygen permeability at a temperature of 23° C. and a relative humidity of 50% according to JIS K 7126-2:2006. The lower the value of the oxygen permeability, the more excellent the oxygen barrier properties.
[Water Vapor Permeability]
The water vapor permeability was measured by arranging each vapor deposition paper such that the overcoat layer was located inside (low humidity side) according to JIS Z 0208:1976 (cup method), B method (temperature: 40° C.±0.5° C., relative humidity: 90%±2%). The lower the value of the water vapor permeability, the more excellent the water vapor barrier properties.
[Barrier Packaging Material Suitability]
The vapor deposition paper of each of Examples B1 to B6 and Comparative Examples B1 to B3 was evaluated for barrier packaging material suitability based on the oxygen permeability and the water vapor permeability measured above.
o: The oxygen permeability was 2 mL/m$^2$·day·atm or less, and the water vapor permeability was 5 g/m$^2$·day or less.
x: The oxygen permeability was larger than 2 mL/m$^2$·day·atm, or the water vapor permeability was larger than 5 g/m$^2$·day.
[Recyclability (Pulp Recovery Rate after Re-Disintegration and Visual Evaluation)]
The obtained vapor deposition paper was disintegrated according to JIS P 8220-1:2012. At this time, 10 minutes after the start of the disintegration, a dispersion liquid was treated with a vibrating flat screen provided with a 6-cut screen, a sample on the 6-cut screen (mesh opening: 0.15 mm) was recovered and dried, thereby calculating the mass ratio (%) of the residue, and a value obtained by subtracting the mass ratio (%) of the residue from 100% was set as a pulp recovery rate (%) after re-disintegration. The recovered pulp was visually evaluated for the presence or absence of colored foreign matter. The recyclability was evaluated based on the pulp recovery rate and the presence or absence of the colored foreign matter.
o: The pulp recovery rate was 80% or more, and no colored foreign matter was present.
x: The pulp recovery rate was less than 80%, or the colored foreign matter was present.

TABLE 2

| | Ex. B1 | Ex. B2 | Ex. B3 | Ex. B4 | Ex. B5 |
|---|---|---|---|---|---|
| Resin layer | Urethane | Urethane | Polyactic acid | Hydroxy group containing urethane | Urethane |
| Vapor deposition layer | Silicon oxide | Silicon oxide | Silicon oxide | Silicon oxide | |
| Overcoat layer | Urethane | Urethane | Urethane | Hydroxy group containing urethane | Urethane |
| Cobb water absorption degree of surface on side of overcoat layer (g/m$^2$) | 0.2 | 0.3 | 0.3 | 0.3 | 0.2 |
| Cobb water absorption degree of surface on side opposite to side of overcoat layer (g/m$^2$) | 25 | 25 | 25 | 25 | 25 |
| Surface specific electrical resistance of overcoat layer ($\Omega$) | $7.4 \times 10^{14}$ | $6.3 \times 10^{14}$ | $7.1 \times 10^{14}$ | $5.8 \times 10^{14}$ | $5.2 \times 10^{14}$ |
| Oxygen permeability (mL/(m$^2$ · day · atm)) | 0.1 | 0.2 | 0.8 | 0.1 | 0.1 |
| Water vapor permeability (g/(m$^2$ · day)) Barrier packaging material suitability | 0.3 | 0.5 | 0.8 | 0.5 | 0.4 |
| Pulp recovery rate (%) | 90 | 92 | 90 | 90 | 90 |
| Presence or absence of colored foreign matter Recyclability | Absence | Absence | Absence | Absence | Absence |

| | Ex. B6 | Comp. Ex. B1 | Comp. Ex. B2 | Comp. Ex. B3 |
|---|---|---|---|---|
| Resin layer | Urethane | Urethane | Ethylene-acrylic acid | Urethane |
| Vapor deposition layer | Silicon oxide + Aluminum oxide | Aluminum | Silicon oxide | Silicon oxide |
| Overcoat layer | Urethane | Urethane | Urethane | Urethane |
| Cobb water absorption degree of surface on side of overcoat layer (g/m$^2$) | 0.3 | 0.2 | 0.3 | 0.3 |
| Cobb water absorption degree of surface on side opposite to side of overcoat layer (g/m$^2$) | 25 | 25 | 25 | 0.5 |
| Surface specific electrical resistance of overcoat layer ($\Omega$) | $5.9 \times 10^{14}$ | $1.0 \times 10^{14}$ | $7.2 \times 10^{14}$ | $7.4 \times 10^{14}$ |
| Oxygen permeability (mL/(m$^2$ · day · atm)) | 0.1 | 0.1 | 99.5 | 0.1 |
| Water vapor permeability (g/(m$^2$ · day)) Barrier packaging material suitability | 0.3 | 0.3 | 7.2 | 0.3 |
| Pulp recovery rate (%) | 91 | 90 | 90 | 65 |
| Presence or absence of colored foreign matter Recyclability | Absence | Absence | Absence | Absence |

The vapor deposition paper of each of Examples B1 to B6 had a lower oxygen permeability, more excellent barrier properties, and more excellent recyclability than those of the vapor deposition paper of each of Comparative Examples B1 to B3.

The invention claimed is:

1. A vapor deposition paper comprising:

a clay coat layer; an undercoat layer; a vapor deposition layer; an overcoat layer; and a heat seal layer in this order on at least one surface of a paper substrate, wherein the vapor deposition layer contains at least one selected from the group consisting of metal and ceramic and has a thickness of 1 nm or more and 1000 nm or less, the heat seal layer contains a lubricant, and a pulp recovery rate after re-disintegration of the vapor deposition paper is 80% or more.

2. The vapor deposition paper according to claim 1, wherein the heat seal layer contains a water-suspendable polymer.

3. The vapor deposition paper according to claim 1, wherein the heat seal layer contains at least one selected from the group consisting of a styrene-butadiene copolymer and an olefin-unsaturated carboxylic acid copolymer.

4. The vapor deposition paper according to claim 1, wherein the clay coat layer contains an inorganic pigment and a binder, and a content of the inorganic pigment in the clay coat layer is 68% by mass or more and 90% by mass or less.

5. The vapor deposition paper according to claim 4, wherein the inorganic pigment has an aspect ratio of 50 or less and a mean particle size of 5 μm or less.

6. The vapor deposition paper according to claim 4, wherein the inorganic pigment is kaolin.

7. The vapor deposition paper according to claim 4, wherein the binder contains one or more selected from the group consisting of a styrene-butadiene resin, a styrene-(meth) acrylic resin, an olefin-unsaturated carboxylic acid copolymer, and polylactic acid.

8. The vapor deposition paper according to claim 1, wherein the undercoat layer and/or the overcoat layer contain(s) a water-suspendable polymer.

9. The vapor deposition paper according to claim 8, wherein the water-suspendable polymer contains one or more selected from the group consisting of a polyester resin and a polyurethane resin.

10. The vapor deposition paper according to claim 1, wherein a content of hardwood pulp in raw material pulp constituting the paper substrate is 80% by mass or more.

11. The vapor deposition paper according to claim 1, wherein the vapor deposition layer contains inorganic oxide, and the inorganic oxide contains at least one selected from the group consisting of silicon oxide and aluminum oxide.

12. The vapor deposition paper according to claim 1, wherein the undercoat layer and/or the overcoat layer contain(s) one or more selected from the group consisting of a polyurethane resin and a polylactic acid, and the polyurethane resin contains at least one selected from the group consisting of a constituent unit derived from metaxylylene diisocyanate and a constituent unit derived from hydrogenated metaxylylene diisocyanate.

13. A method for producing a vapor deposition paper having a clay coat layer, an undercoat layer, a vapor deposition layer, an overcoat layer, and a heat seal layer in this order on at least one surface of a paper substrate, the method comprising:

applying a coating liquid in which a water-suspendable polymer is dispersed in an aqueous medium to form the undercoat layer and the overcoat layer, and applying a coating liquid in which a water-suspendable polymer and a lubricant are dispersed in an aqueous medium to form the heat seal layer.

14. The method for producing a vapor deposition paper according to claim 13, wherein the water-suspendable polymer in the step of forming the undercoat layer and/or the step of forming the overcoat layer contains one or more selected from the group consisting of a polyurethane resin and a polylactic acid, and the polyurethane resin contains at least one selected from the group consisting of a constituent unit derived from metaxylylene diisocyanate and a constituent unit derived from hydrogenated metaxylylene diisocyanate.

15. A vapor deposition paper having a coating layer, a vapor deposition layer, an overcoat layer, and a heat seal layer in this order on one surface of a paper substrate, wherein the heat seal layer contains a lubricant, a Cobb water absorption degree of a surface on a side of the overcoat layer at a temperature of 23° C. for a contact time of 120 seconds measured according to JIS P 8140:1998 is 1.0 g/m² or less, a Cobb water absorption degree of a surface on a side opposite to the side of the overcoat layer at a temperature of 23° C. for a contact time of 120 seconds measured according to JIS P 8140:1998 is 10 g/m² or more, a surface specific electrical resistance of the surface on the side of the overcoat layer measured according to JIS C 2139:2008 is $1.0 \times 10^{12} \Omega$ or more, and when a laminated sheet is formed by laminating a 20 μm thick unstretched polypropylene film on the overcoat layer of the vapor deposition paper, an oxygen permeability of the laminated sheet at a temperature of 23° C. and a relative humidity of 50% measured according to JIS K 7126-2:2006 is 2.0 mL/m²·day·atm or less.

16. The vapor deposition paper according to claim 15, wherein a water vapor permeability at a temperature of 40° C. and a relative humidity of 90% measured according to JIS Z 0208:1976 (cup method), B method is 1.0 g/(m²·day) or less.

17. The vapor deposition paper according to claim 15, wherein the coating layer has a clay coat layer and an undercoat layer in this order from a side of the paper substrate.

18. The vapor deposition paper according to claim 15, wherein the coating layer has a clay coat layer and an undercoat layer in this order from a side of the paper substrate, the undercoat layer and/or the overcoat layer contain(s) one or more selected from the group consisting of a polyurethane resin and a polylactic acid, and the polyurethane resin contains at least one selected from the group consisting of a constituent unit derived from metaxylylene diisocyanate and a constituent unit derived from hydrogenated metaxylylene diisocyanate.

* * * * *